(12) United States Patent
Morton et al.

(10) Patent No.: US 7,461,466 B2
(45) Date of Patent: Dec. 9, 2008

(54) METHOD AND APPARATUS FOR DRYING WET BIO-SOLIDS USING EXCESS HEAT FROM A CEMENT CLINKER COOLER

(75) Inventors: Edward L. Morton, Bethlehem, PA (US); Laszlo Szabo, Macungie, PA (US); Rainer Nobis, Emmaus, PA (US); Shane Alesi, Kutztown, PA (US)

(73) Assignee: Lehigh Cement Company, Allentown, PA (US)

( * ) Notice: Subject to any disclaimer, the term of this patent is extended or adjusted under 35 U.S.C. 154(b) by 676 days.

(21) Appl. No.: 10/866,999

(22) Filed: Jun. 14, 2004

(65) Prior Publication Data

US 2005/0274066 A1 Dec. 15, 2005

(51) Int. Cl.
*F26B 3/00* (2006.01)
(52) U.S. Cl. ............................... 34/469; 34/468; 432/66
(58) Field of Classification Search ............... 34/74, 34/201, 407, 468, 469, 72, 73; 62/55.5; 432/266, 432/66
See application file for complete search history.

(56) References Cited

U.S. PATENT DOCUMENTS

| | | | |
|---|---|---|---|
| 1,121,204 A | 12/1914 | Rigby | |
| 1,369,611 A | 2/1921 | Bosch | |
| 1,965,513 A | 7/1934 | Ruzicka et al. | |
| 2,879,983 A | 3/1959 | Sylvest | |
| 3,836,321 A | 9/1974 | Kobayashi et al. | |
| 4,022,630 A | 5/1977 | Watson et al. | |
| 4,081,285 A | 3/1978 | Pennell | |
| 4,203,376 A | 5/1980 | Hood | |
| 4,285,140 A | 8/1981 | van Raam et al. | |
| 4,381,916 A | 5/1983 | Wolter et al. | |
| 4,391,671 A | 7/1983 | Azarniouch | |
| 4,556,428 A * | 12/1985 | Wolter et al. ................ 106/751 |
| 4,627,877 A | 12/1986 | Ogawa et al. | |
| 4,678,514 A | 7/1987 | Deyhle et al. | |
| 4,702,745 A | 10/1987 | Kamei et al. | |
| 4,875,905 A | 10/1989 | Somerville et al. | |
| 4,898,615 A | 2/1990 | Trivino Vazquez et al. | |
| 4,913,742 A | 4/1990 | Kwech | |
| 4,921,538 A | 5/1990 | Lafser, Jr. et al. | |
| 4,984,983 A | 1/1991 | Enkegaard | |
| 5,057,009 A | 10/1991 | Nechvatal et al. | |
| 5,078,593 A | 1/1992 | Schreiber, Jr. et al. | |

(Continued)

FOREIGN PATENT DOCUMENTS

DE 4122113 4/1992

(Continued)

OTHER PUBLICATIONS

C.A. Sikalidis et al., "Utilistation of municipal solid wastes for mortar production", Resources Conservation and Recycling, Elsevier Science Publisher, vol. 36, No. 2, Aug. 2002, pp. 155-167.

(Continued)

*Primary Examiner*—Kenneth B Rinehart
(74) *Attorney, Agent, or Firm*—RatnerPrestia

(57) ABSTRACT

Method and apparatus for drying wet bio-solids by utilizing waste heat from a clinker cooler in a cement making process.

10 Claims, 4 Drawing Sheets

U.S. PATENT DOCUMENTS

| | | | |
|---|---|---|---|
| 5,122,189 A | 6/1992 | Garrett et al. |
| 5,141,526 A | 8/1992 | Chu |
| 5,156,676 A | 10/1992 | Garrett et al. |
| 5,199,987 A | 4/1993 | Ernstbrunner |
| 5,201,652 A | 4/1993 | Kawamura et al. |
| 5,224,433 A | 7/1993 | Benoit et al. |
| 5,288,413 A | 2/1994 | Chu |
| 5,336,317 A | 8/1994 | Beisswenger et al. |
| 5,342,442 A | 8/1994 | Nechvatal et al. |
| 5,392,721 A | 2/1995 | Judd |
| 5,454,333 A | 10/1995 | Von Seebach et al. |
| 5,530,176 A | 6/1996 | Brady |
| 5,555,823 A | 9/1996 | Davenport |
| 5,614,016 A | 3/1997 | Hundeb.o slashed.l |
| 5,711,768 A | 1/1998 | Schulz |
| 5,718,735 A | 2/1998 | Somerville et al. |
| 5,797,972 A | 8/1998 | Schulz |
| 5,837,052 A | 11/1998 | Oates et al. |
| 5,862,612 A | 1/1999 | Bielfeldt |
| 5,888,256 A | 3/1999 | Morrison |
| 5,890,888 A | 4/1999 | Enkegaard |
| 5,895,213 A | 4/1999 | Sutoh et al. |
| 6,083,404 A | 7/2000 | Sommese et al. |
| 6,146,133 A | 11/2000 | Erhard et al. |
| 6,168,709 B1 | 1/2001 | Etter |
| 6,176,187 B1 | 1/2001 | Leonard et al. |
| 6,183,242 B1 | 2/2001 | Heian |
| 6,383,283 B1 | 5/2002 | Doumet |
| 6,391,105 B1 | 5/2002 | Oates et al. |
| 6,436,157 B1 | 8/2002 | Winter et al. |
| 6,439,139 B1 | 8/2002 | Jones |
| 6,457,425 B1 | 10/2002 | Crafton et al. |
| 6,470,812 B1 | 10/2002 | Arroyave-Garcia et al. |
| 6,615,751 B1 | 9/2003 | Sorensen et al. |
| 6,653,517 B2 | 11/2003 | Bullock |
| 6,685,771 B2 | 2/2004 | Long et al. |
| 6,689,925 B2 | 2/2004 | Malhis |
| 6,692,544 B1 | 2/2004 | Grillenzoni |
| 7,037,368 B2 | 5/2006 | Hoffis |
| 7,189,074 B2 | 3/2007 | Leung et al. |
| 2002/0148780 A1 | 10/2002 | Tiemeyer |
| 2003/0029364 A1 | 2/2003 | Bland et al. |
| 2003/0061972 A1 | 4/2003 | Key Jr. |
| 2004/0034262 A1 | 2/2004 | Van de Beld et al. |
| 2005/0066860 A1 | 3/2005 | Logan et al. |
| 2005/0274067 A1* | 12/2005 | Morton et al. ............ 44/606 |
| 2005/0274293 A1* | 12/2005 | Morton et al. ............ 106/745 |
| 2006/0107875 A1 | 5/2006 | Hoffis |

FOREIGN PATENT DOCUMENTS

| | | |
|---|---|---|
| JP | 7300355 | 11/1995 |
| JP | 09248600 | 9/1997 |
| JP | 11217576 | 8/1999 |
| JP | 2000265186 | 9/2000 |
| PL | 145666 | 10/1988 |
| PL | 180555 | 2/2001 |

OTHER PUBLICATIONS

Derwent Publication LTD., AN 2003-027726; XP002345776, Green Island Environmental Technologies, Jan. 2002, Abstract Only.

International Search Report, Appln No. PCT/US2005/020577, mailed Oct. 7, 2005.

* cited by examiner

METHOD AND APPARATUS FOR DRYING WET BIO-SOLIDS USING EXCESS HEAT FROM A CEMENT CLINKER COOLER

BACKGROUND OF THE INVENTION

The present invention pertains to use of bio-solid materials as a fuel or fuel additive in a cement making process. In particular, the present invention pertains to incorporating drying of the wet bio-solid materials in a conventional cement making process and cement making apparatus.

Bio-solids are defined as a residual by-products from biological activity or the residual by-products from processing of biological materials. Materials that are of interest for use in the method and apparatus of the present invention include sewage sludge, paper pulp residue, industrial sludges, food processing sludges and agricultural waste sludges.

Conventional cement making processes e.g. the manufacturing processes and apparatus for the manufacture of Portland Cement, are based upon the processing of limestone ($CaCO_2$) by heating to achieve a cement clinker which is basically calcium oxide (CaO) chemically bound with other materials such as alumina, silica and iron.

In a conventional Portland Cement manufacturing process the main raw ingredient limestone is prepared with or without smaller amounts of materials containing alumina, silica and iron and are ground to produce what is called a raw meal. The meal is then conducted to a pyro-processing area, which may include preheaters and calciners to condition the raw meal for introduction into a rotary kiln where the intermediate product clinker is produced. The main kiln and the preheaters and calciners are conventionally heated with a burner using coal, oil or gas as the fuel component. The coal, oil or gas is generally mixed with preheated combustion air and ignited to provide the heat necessary to decarbonate and melt the raw meal to produce clinker. At the discharge end of the conventional rotary kiln, the hot clinker is introduced into a clinker cooler wherein large amounts of air are blown through the hot clinker to cool it to a temperature of about 200° F. After sufficient cooling the clinker can be ground into a final product. In the grinding operation of the cooled clinker a small amount of gypsum may be added to produce the finished Portland Cement.

One of the largest cost items in the manufacture of cement is the cost of fuel. With ever increasing prices for coal, oil and gas alternate fuel sources are constantly be sought for use in the process.

Among the materials which have been considered for use as alternate fuels are bio-solid materials, which have been processed prior to delivery to the cement manufacturing plant to remove moisture so that the dried bio-solid materials are of a moisture content and size to be introduced into the combustion processes for the cement manufacturing process.

U.S. Pat. No. 4,627,877 discloses a method and apparatus for continuously producing cement clinker. Patentees disclose use of waste material as fuel in a cement manufacturing process. The method and apparatus of the '877 patent provide for a cooling of cement clinker and the use of recovered energy to promote heat decomposition of combustible material.

U.S. Pat. No. 6,436,157 discloses a method for gasification of bio-sludge. The intracellular water of the bio-sludge material is reduced by heating the bio-sludge material at a temperature sufficient to weaken the bacterial cell walls. The water-reduced concentrated bio-sludge may then serve as a fuel source. Heating is accomplished by using a heat exchanger with details of the heat exchange process set forth at column 4, lines 47-67 of the '157 patent. The heating process is by a direct heat exchange, however, there is no disclosure of using indirect heat exchange with heat taken from a clinker cooler in a cement manufacturing process.

U.S. Pat. Nos. 5,895,213; 5,201,652; and 3,836,321 all describe various clinker cooling devices used to recover heat energy from the cement clinker being cooled. The heat recovered from the clinker cooler can be used in other parts of the process such as preheating.

U.S. Pat. No. 5,862,612 discloses a method and system for dewatering carboniferous materials using a vaportight pressure chamber. Water bound by capillary forces in fiber cells is reduced by a thermal mechanical dewatering process. Patentees describe a dewatering process involving three steps, the first of which is heating of the high porous organic material at an elevated temperature and at a high pressure thus reducing the moisture of the solid material. Patentees rely on high temperature and high pressure to effect dewatering of the material which may be used as a fuel. However, there is no disclosure of coupling this process with a cement manufacturing process.

U.S. Pat. No. 4,702,745 is directed to a process for dewatering high moisture content porous organic solids. Patentees process involves three steps, the first of which is heating the high moisture content porous organic solid at elevated temperature and high pressure to reduce the moisture content of the solid. Here again, there is no relationship of this process to a cement manufacturing process.

U.S. Pat. Nos. 1,965,513; 2,879,983; 4,285,140; 5,890,888; and 6,083,404 disclose methods for upgrading a material by drying using various techniques.

SUMMARY OF THE INVENTION

The present invention pertains to a method and apparatus for incorporating wet bio-solids into a conventional cement making process so that the wet bio-solids can be brought to the cement manufacturing facility where they are dried and conditioned for use as a fuel or fuel additive in the cement making process.

The wet bio-solids are dried using heat derived from the cement clinker cooler. Heat from the cooler is extracted by a heat exchange fluid which is introduced into a contact dryer used to dry the wet bio-solids.

The dried bio-solids can either be stored for future use or incorporated directly into the combustion processes of the cement making operation.

Therefore, in a first aspect the present invention is a method for drying wet bio-solid material for use as a fuel or fuel additive in a cement making process by extracting excess heat from a clinker cooling apparatus used in the cement making process; using the excess heat extracted from the clinker cooler to heat a contact drying surface; exposing the wet bio-solid material to the contact drying surface whereby the bio-solids are dried by evaporation of moisture and volatile organic components from the wet bio-solids; condensing water evaporated from the bio-solids for reuse or safe disposed; recovering volatile organic vapors for introduction into a combustion process in the cement making process; and recovering a dried bio-solid product.

In another aspect the present invention is an apparatus for manufacturing cement, the apparatus having a main rotary kiln, an optional pre-heater, an optional calciner and a clinker cooler, the improvement comprising; incorporating into the apparatus means for using excess heat generated in the clinker cooler to dry wet bio-solids material for use as a primary fuel or fuel supplement in the cement making apparatus.

In yet another aspect the present invention is an apparatus including means to dry wet bio-solids which includes a contact dryer to dry the bio-solids by direct contact with a heated surface or surfaces, and means to heat the surface or surfaces by heat exchange of a heat exchange fluid with excess heat in a cement clinker cooler, the heat exchange fluid being in a closed loop between a heat exchanger in the clinker cooler and internally of the heated surfaces.

A major benefit from the present invention resides in the ability to avoid landfill disposal of bio-solid materials that will decay and generate methane a known and unwanted atmospheric "Greenhouse Gas".

DETAILED DESCRIPTION OF THE INVENTION

Figure 1:
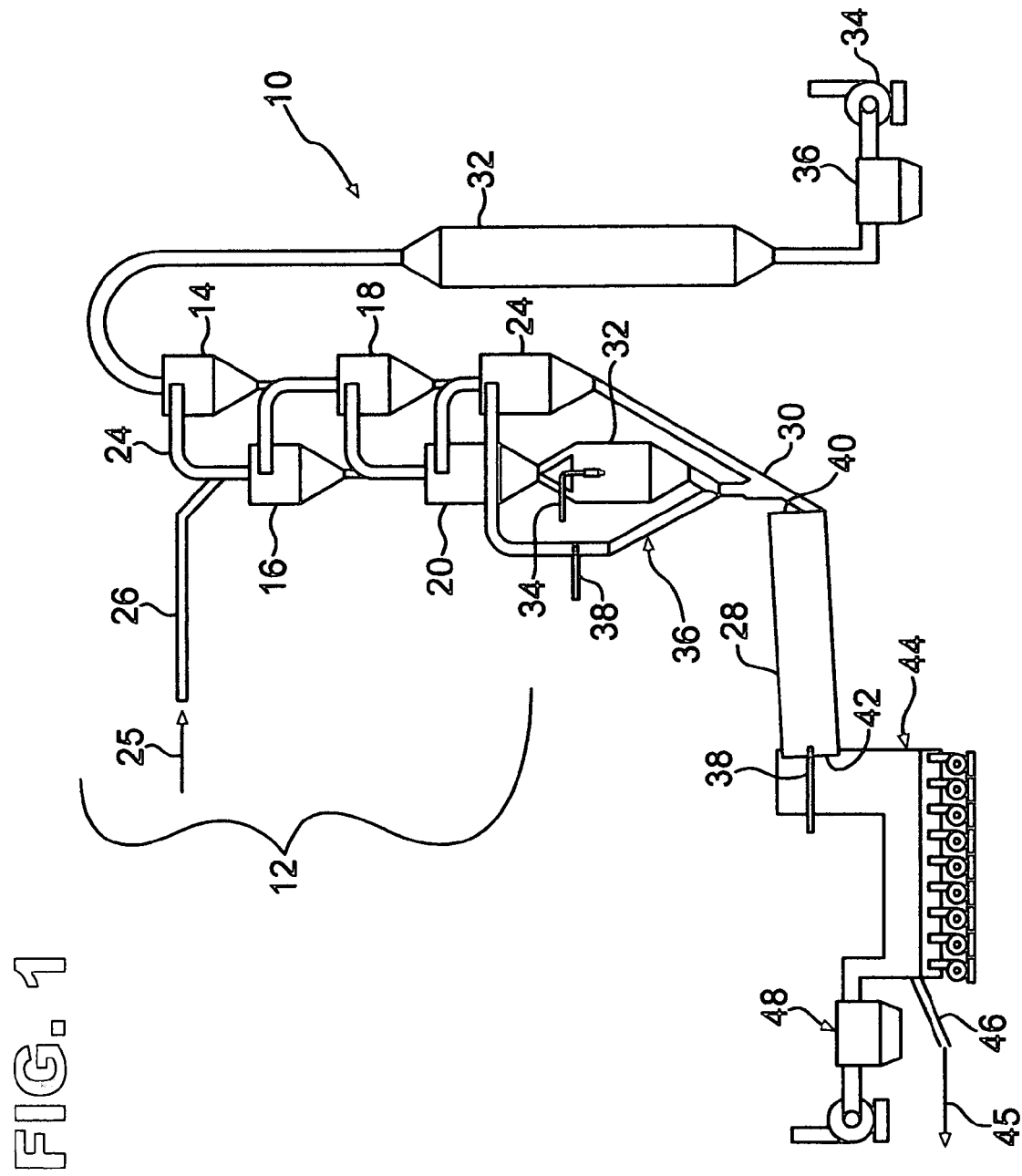
FIG. 1 is a schematic representation of a conventional cement making process.

Bio-solids, defined as residual by-products from biological activity or the residual by-product from processing biological material, are of interest for use as a fuel or a fuel additive in the manufacture of cement.

Table 1 sets forth types of materials that would be usable in the method and apparatus of the present invention.

Of the materials in the foregoing table sewage sludge is the semi-solid residue of sewage treatment processes.

Paper pulp bio-solids generally consist of organic based by-products from paper manufacturing. Paper manufacturing uses conventional sources of cellulose such as wood and flax. Paper manufacturing also uses secondary sources of cellulose such as waste paper and waste cardboard. The manufacturing process requires the grinding, particle size classification, heating, and blending of conventional and secondary sources of cellulose. These processes generate by-products that have various concentrations of water and organic components.

Industrial sludges for use in the present invention, contain organic based by-products with liquid or solid hydro-carbon components. Petroleum tanker sludge, oil soaked clay, oil soaked filter media, sediment from coal washing operations and wet flexi coke are examples of suitable industrial sludges.

Food processing sludges are generated from many process operations. At the beginning and end of batch processes, off spec materials are generated and must be disposed. Similarly, when process equipment is periodically cleaned or cleaned between batch runs materials are generated and must be disposed. These materials generally consist of grain and vegetable based products that are being ground, mixed and dosed to produce various food products. In other processes diatomaceous earth filter media often becomes saturated with the organic residues form mixing, batching, cooking and pasteurizing processes. These saturated filter media materials are suitable bio-solid sludges for the processes of the present invention.

Agricultural waste sludges consist of by-products from harvesting and processing crops. Materials such as stalks, seeds, shells, pits, skins, rinds, twigs, leaves, and bark with various concentrations of moisture are suitable for the process of the present invention.

According to the present invention the method and apparatus are used to separate water and organic components from the bio-solid materials. Organic components can be recovered and burned with ash residue chemically incorporated into the cement manufacturing process. The overall method and apparatus of the present invention minimizes negative environmental impact from the drying and reuse of the wet bio-solid materials.

A conventional cement manufacturing process uses large volumes of raw materials such as limestone and coal to produce Portland Cement. The process consists of three main areas, raw meal preparation, pyro-processing, and finished grinding. Limestone ($CaCO_2$) is generally the main raw

TABLE 1

| Material | Solid %/Liquid % | Fuel %/Ash % (Dry) | Fuel BTU's/lb (Dry) | Critical Ash Components |
| --- | --- | --- | --- | --- |
| Sewage Sludge | 15/85 | 70/30 | 5,000-8,000 | $P_2O_5$, Cl |
| Paper Pulp | 20/80 | 70/30 | 5,000-8,000 | Na2O, K2O |
| Industrial Sludges | 20/80 | 50/50 | 5,000-8,000 | varies |
| Food Processing Sludges | 20/80 | 50/50 | 5,000-8,000 | varies |
| Agri-Waste Sludges | 20/80 | 50/50 | 5,000-8,000 | varies |

The foregoing materials are the wettest types of material that can be used in the method and apparatus of the present invention. Materials having moisture content above 10% by weight but less than the moisture content set out in Table 1 can also be used in the process of the present invention.

ingredient. Smaller amounts of materials containing alumina, silica and iron are proportioned and ground with limestone to produce a raw meal. A precisely controlled mixture of raw meal is then fed to the pyro-processing area. The pyro-processing area burns large amounts of conventional fuel such as coal, oil and gas to generate the temperatures required to calcine the limestone and allow the new cement components to form. An intermediate product called clinker is produced in the pyro-processing area. Clinker is cooled from high pyro-processing temperatures to ambient temperature. A finished grinding process which incorporates a small percentage of gypsum into the clinker results in a Portland Cement product.

Referring to FIG. 1 a conventional clinkering process is embodied in the apparatus shown as 10. The apparatus 10 includes a preheating section 12 which can include a series of preheater stages 14, 16, 18, 20 and 22, which are interconnected with recovery conduits, e.g. 24, wherein the raw meal represented by arrow 25 introduced by a conduit 26 is gradually preheated for introduction into the main kiln 28 via a conduit 30. Downstream of the preheater section the process apparatus include a calciner 32, which is fired with a conventional burner 34 to begin the conversion of the limestone to clinker. The calciner portion of the process can include a loop system 36 which includes a conduit 38 to introduce additional fuel into the loop system 36 whereby the fines from the calciner are recycled and eventually introduced into the main kiln 28.

Gases and fine particles exiting the preheater section 12 are sent to a cooling tower 32 for cooling of the gases and exhausting via a blower 34. Dust is removed in a dust collector 36.

Main kiln 28 includes a main burner 38 which is fired using a fuel such as coal, oil or natural gas together with an oxygen containing fluid such as air. The preheated or pre-calcined meal enters the kiln at a first or entry end 40. As the meal progresses from the entrance 40 to the exit 42 of the kiln 28 it is converted into a clinker. The clinker exits the kiln 28 and is deposited into a clinker cooler 44 where the clinker is cooled to a temperature of about 200° F. Thereafter, the clinker represented by arrow 45 is conducted via a conduit for other delivery device 46 to the grinding operation. The clinker cooler 44 includes a dust recovery system 48 so that dust can be recycled to the pyro-processing portion of the cement making process.

Figure 2:
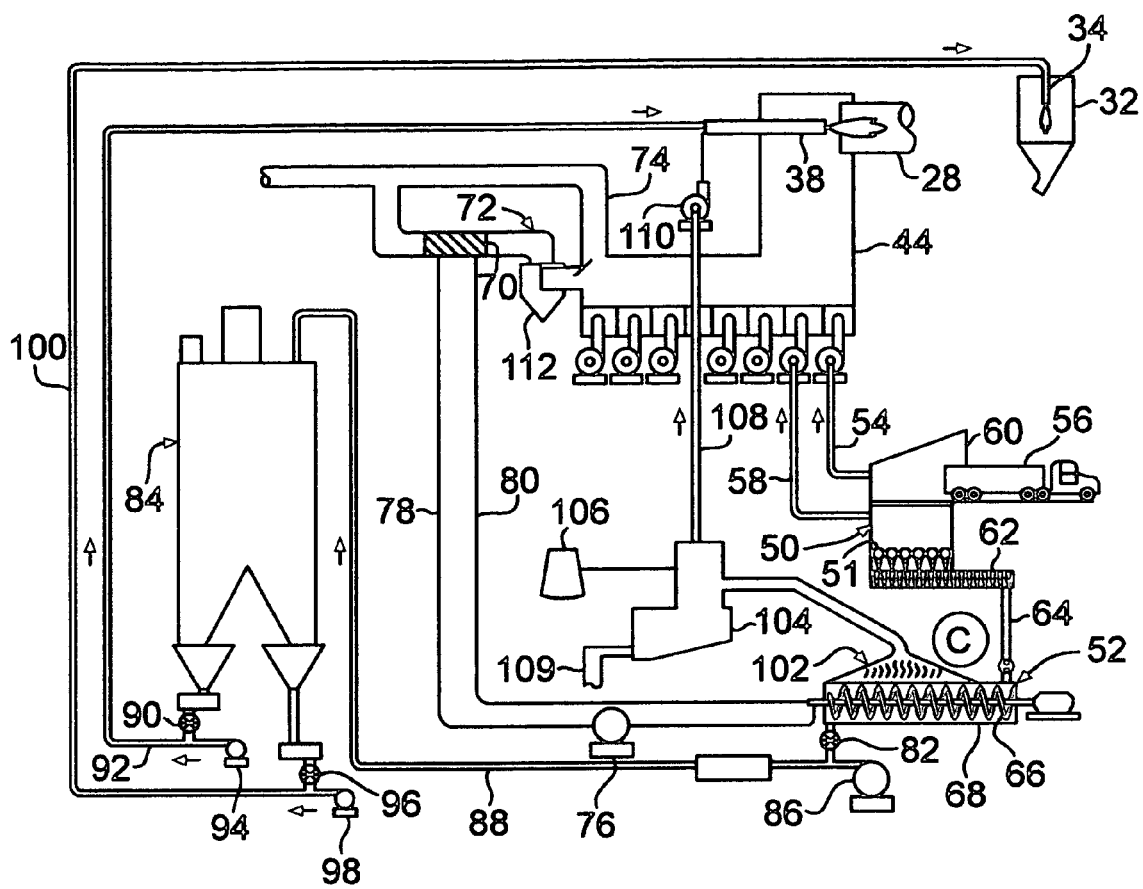
FIG. 2 is a schematic drawing of the process and apparatus according to the present invention.

Referring to FIG. 2 the apparatus of the present invention is shown incorporated into the conventional cement making process in connection with the clinker cooler 44. The method and apparatus of the present invention incorporates a bio-solids unloading station 50 wherein the wet bio-solids are unloaded and distributed to a contact dryer 52. The bio-solids unloading station 50 is under a slight negative pressure so that volatile organic compounds and other odors from the bio-solids being dumped into the unloading station 50 can be withdrawn by a conduit 54 and introduced into the clinker cooler 44. The slight negative pressure of the unloading station controls potential emission from the wet bio-solid material. The bio-solid material is delivered to the facility in covered dumped trailers, e.g. 56 or bladder trucks. Bladder trucks would be a preferred method because of the ability to control odors during transport and unloading of the bio-solid material. A bladder truck contains an internal flexible chamber in which the wet bio-solid material would be transported. At the unloading point a conduit from the bladder would be connected to the receiving hopper or device 51 of the unloading station 50. Compressed air or other high pressure fluid would be introduced between the inner flexible chamber and the outer fixed chamber of the bladder truck. Thus the wet bio-solid material will be extruded into the hopper 51 and generation of volatile organic emissions will be minimized. Any organic vapors from receiving hopper 51 of unloading station 50 will be conducted to the clinker cooler 44 via conduit 53. Additionally, the main introduction point of unloading station 50 will have a movable cover 60 to facilitate unloading of covered dump trailers. The moveable cover 60 will be kept closed between unloading events. When covered dump trailers are unloaded more air will be drawn into the clinker cooler to insure that these areas continue to have a slight negative pressure and thus odors emitted from the wet bio-solid materials are controlled.

A universal unloading station containing both a bladder truck unloading system and a dump trailer unloading system can be constructed to improve the economics of the overall process.

Referring to FIG. 2 the method and apparatus of the present invention will include a closed contact dryer 52. The wet bio-solid materials will be conducted via a closed feeding system 62, 64 into the dryer 52. The dryer 52 will include contact drying surfaces, which may be in the form of an auger 66 which is heated by a conduit where heat exchange fluid is introduced into the inner portion of the auger 66. In addition, the outer case 68 of dryer 52 can also be heated, the case being provided with a double wall structure (outer jacket) so that heat exchange fluid is introduced between the walls of the double wall portion of the case 68 of dryer 52. A heat exchange fluid will be circulated through the auger and the outer jacket and through a heat exchanger 70 contained in the exhaust duct system 72, 74 of clinker cooler 44. The heat exchanger 70 will receive the heat exchange fluid which is circulated by a blower or pump 76 connected in the closed loop system including heat exchanger 70, dryer 52 and conduits 78 and 80 respectively. The heat exchange fluid is heated by the heat of the clinker cooler 44 which may be as high as 1000° F. Normally the clinker enters the cooler 44 at a temperature greater than 2000° F and exits at a temperature at about 200° F.

The heat exchange fluid indirectly contacts the wet bio-solid materials which are then dried and leave the contact dryer 52 through a valved conduit 82. The dried bio-solids are transported to a storage facility 84 by a pneumatic transport pump 86 and suitable conduit 88. The dry bio-solids can be stored and used as necessary in the overall process. For example, a first dosing system consisting of a metering valve 90, and conduit 92 and pump 94 can be used to withdraw the dried bio-solids from storage bin 84 and conduct them directly to the main burner 36 of kiln 28. A second dosing system (metering valve 96, pump 98) similar to the first can be used to withdraw bio-solids and conduct them via conduit 100 to the burner 34 contained in the calciner 32.

Referring back to the dryer 52 a collection system 102 removes moisture and volatile organic compound from the dryer 52. The water vapor and volatile organic compounds are passed into a condenser separator 104, which is cooled by a cooling apparatus 106 as is well known in the art. The condenser/separator 104 permits the water vapor to be condensed to liquid water essentially free of organic components, which is removed by conduit 109 to used in the overall cement making process as needed.

Volatile organic compounds are recovered from the condenser/separator 104 and passed, depending upon volumetric flow, into the inlet of the clinker cooler fans in the clinker cooler 44. Alternatively, the volatile organic compounds can be recovered in conduit 108 and introduced into kiln burner 38 by fan or blower 110 where they are combusted to products of combustion that can be incorporated into the clinker without affecting the properties of the clinker.

A core feature of the drying process is the use of the closed dryer 52. This device will use thermal fluid heat exchanged against the heat in the clinker cooler 44 to heat the bio-solid material in a confined space to drive off a controlled amount of moisture. The hot thermal fluid used to heat the bio-solid material is heated by heat exchange in a heat exchanger 70 located in a by-pass duct system 72 of the clinker cooler 44 in order to extract the maximum amount of heat from the clinker cooler. Varying the amount of hot clinker cooler gases that are directed through the by-pass system 72 will vary the amount of hot thermal fluid generated for introduction into the dryer 52. Flow rate and temperature of the circulating thermal fluid will determine the maximum amount of water that can be separated from the wet bio-solid material during any given period of time. The maximum flow rate and temperature of hot thermal fluid will depend upon the size and efficiency of a given clinker cooler. Depending upon the composition of exit gases from the clinker cooler 44 it may be necessary to use a cyclone separator 112 to remove excessive amounts of fine particle to prevent excessive build-up on contact surfaces of heat exchanger 70.

Water vapor and volatile organic vapors generated by the closed dryer 52 will be conveyed to the condenser/separator 104 by maintaining a slight negative pressure in the system. This negative pressure will be generated by tapping into one of the clinker cooler fan intake ducts or into the primary air fan intake for the main burner. The condenser/separator 104 will remove water vapor from the dryer 52 discharge and the negative pressure will convey any volatile organic vapors into the pyro-processing phase of the cement making process. Condensed water vapor can be used for conditioning (cooling) the exhaust gas stream from the pyro-process before it enters the final dust collector.

The closed dryer will be operated to obtain approximately 10% moisture content by weight in the dried bio-solid material when it leaves the dryer. Monitoring the material and vapor discharge temperatures and varying the temperature of the incoming heat to the dryer makes it possible to control the moisture content of the dried bio-solids leaving the dryer. It will be possible to reduce the residual moisture content of the dried bio-solids below 10%. However, as the moisture content is reduced below 10% it is expected that the dried bio-solids will become increasingly dusty (i.e. finer average particle size). Depending on the type of bio-solid material being dried, this may or may not be an advantage in the handling, storage and use of the dried bio-solid material.

As stated above the dried bio-solid material will be pneumatically conveyed to a storage device or silo 84. Depending upon the temperature, it may be necessary to either cool the dried bio-solid material in a separate cooling (heat exchange) device or use a cooled conveying gas to transport the dried bio-solids to the storage silo 84. Any of these methods or an alternate method of cooling may be employed to ensure that the dried bio-solids are delivered to the storage silo 84 at a temperature of less than 40° C. (less than 104° F.).

It is also within the scope of the invention to introduce dried bio-solid material into the storage device 84 where the material has been dried off site and transported in a pre-dried condition to the cement plant. Bio-solid materials that have been dried off site by thermal, solar or a composting processes can also be used for their residual mineral and energy value. Any storage system therefore will be designed to accommodate these materials and unload them and use them in the overall cement making process.

Any storage device must be designed in accordance with all applicable local, state and federal codes and regulations to insure safe handling of such material. It is believed that procedures and methods that are used for the storage and handling of pulverized coal will enable a user to comply with such laws and regulations for storage and handling of dried bio-solid materials.

Although the storage system will have the ability to withdraw and dose the dried bio-solid material as needed alternate transport methods may be practical in some cement processes. Some cement plans have existing pneumatic transport systems for conveying a primary fuel such as pulverized coal. With such a system it is possible to deposit a controlled flow rate of dried bio-solids directly into an existing pneumatic transport line. In this aspect, the dosing systems would discharge through a rotary air lock directly into the pneumatic transport system.

Figure 3A:
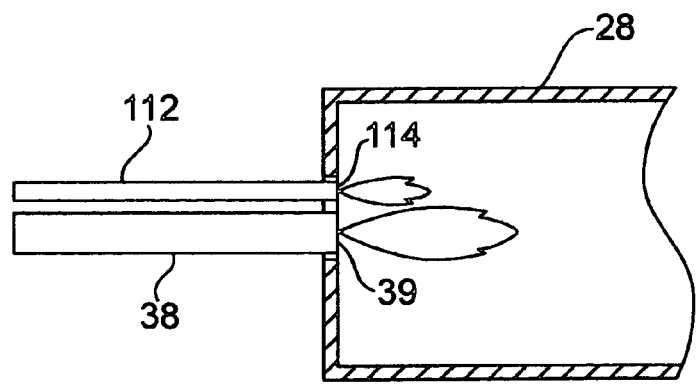
FIG. 3a is a schematic representation of one method and apparatus for introducing dried bio-solids into the combustion zone of a cement kiln.
Figure 3B:
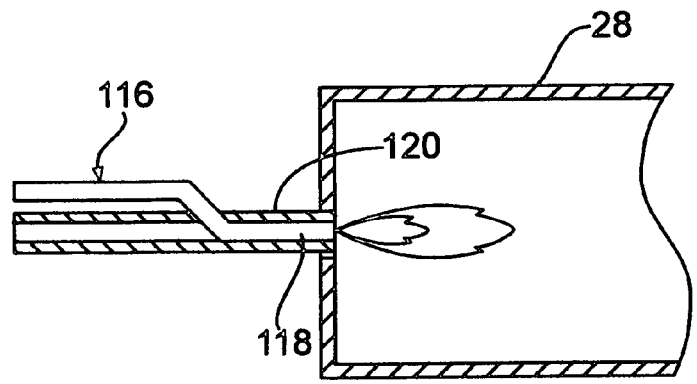
FIG. 3b is an alternate embodiment of another method and apparatus for introducing dried bio-solids into the main burner of a cement kiln.
Figure 3C:
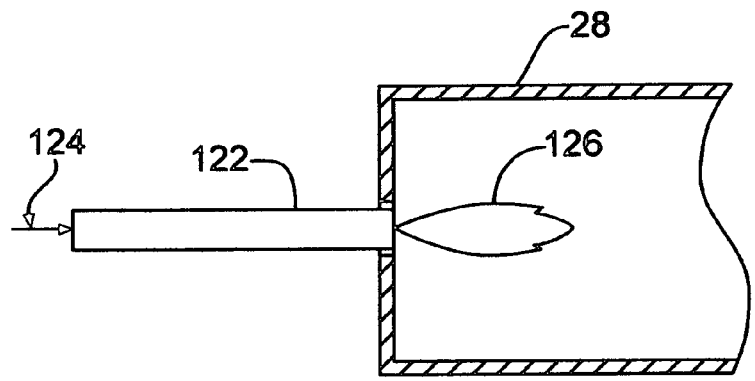
FIG. 3c is a schematic representation of a method for introducing dried bio-solids directly into a conventional burner of a cement kiln without modification of the main burner.

Referring to FIGS. 3*a*, 3*b* and 3*c* the dried bio-solids transported to the combustion (burning) zone of kiln 28 can be introduced into in several ways. If the dried bio-solids are conveyed to the main burning zone of kiln 28 by an independent pneumatic conveying line, a separate burner pipe, e.g. 112 in FIG. 3*a*, can be used to introduce the dried bio-solids into the rotary kiln. The nozzle or discharge end 114 of pipe 112 can be placed at any location proximate the discharge end or nozzle end 39 of the main burner 38.

As shown in FIG. 3*b* the dried bio-solids can be conveyed to the burning (combustion) zone of kiln 28 via an independent pneumatic conveying line 116, which terminates in a conduit 118, which is inside of the burner 120. Burner 120 can be a multi port or a concentric tube burner, such burners being well known in the art.

As shown in FIG. 3*c* the dried bio-solids can be conveyed directly to the burner 122 in kiln 28 together with the normal fuel, e.g. pulverized coal, as represented by arrow 124 to produce the flame 126 inside the kiln 28.

It should be noted that the particle size of fuels burned in the main combustion zone of the cement kiln is of critical importance. If too many large particles of fuel enter this portion of the kiln there is a possibility that some of them may fall into the reaction zone of the kiln and adversely affect the quality of the clinker produced. For this reason the degree of fineness of the dried bio-solids must be monitored closely. As set forth above the particle size of the dried bio-solids will be a function of the moisture content, which will be adjusted as needed. If adjusting the moisture content does not yield a sufficiently small particle size, it may be necessary to use a mechanical size reduction (i.e. grinding) device to optimize the size of the dried bio-solids to be used in a combustion zone.

Figure 4A:
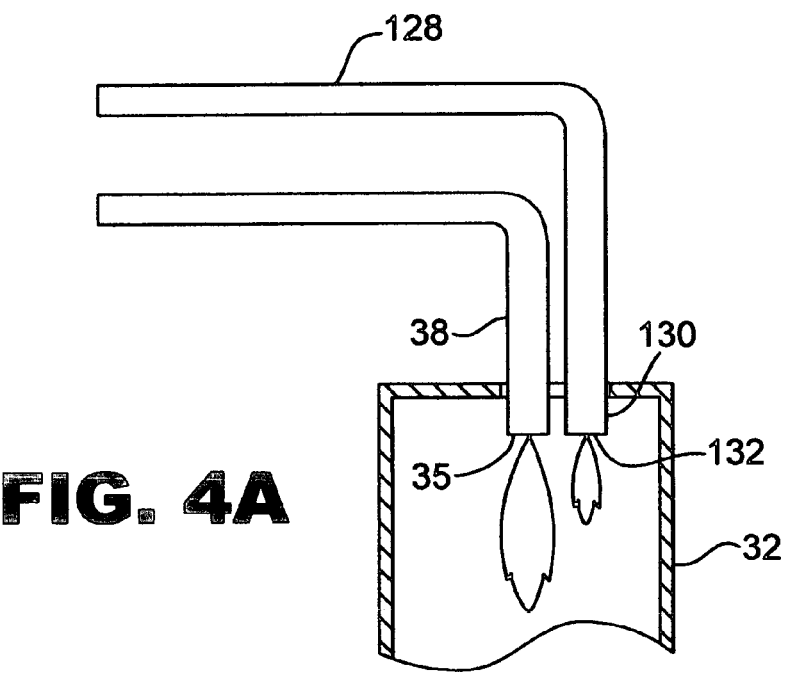
FIG. 4a is a schematic representation of a method an apparatus for introducing dried bio-solids into a calciner using an auxiliary pipe.
Figure 4B:
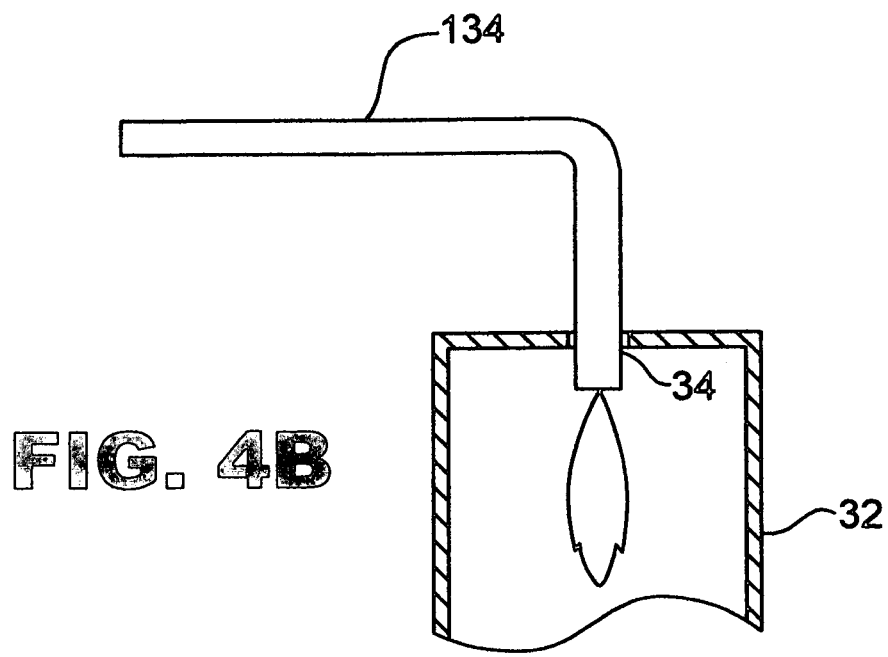
FIG. 4b is a schematic representation of a method and apparatus for introducing dried bio-solids into a calciner using a conventional burner.

As shown in FIG. 4*a* if the dried bio-solids are conveyed to the calciner 32 via an independent pneumatic conveying line 128 they can be introduced to the calciner 32 combustion zone with a separate burner pipe 130 having a discharge end 132, which is proximate the discharge end 35 of conventional fuel burner 34. Alternatively, as shown in FIG. 4*b* the dried bio-solids can be conveyed directly to the calciner 32 burner 84 via an existing pneumatic conveying line 134 where they would mix with the primary fuel (e.g. pulverized coal) and introduced into the combustion zone through the existing main burner 34.

Figure 5:
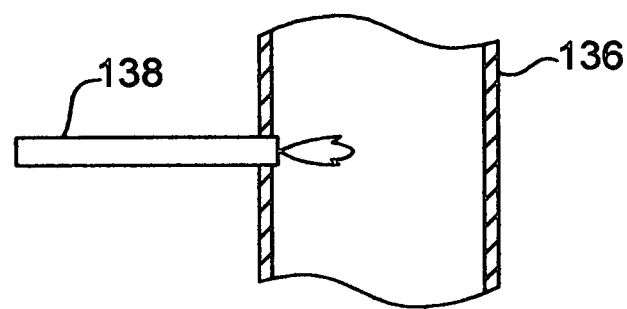
FIG. 5 is a schematic representation of a method and apparatus for introduction of dried bio-solids into the loop duct of a preheating apparatus used in a conventional cement making process and apparatus.

As shown in FIG. 5 a calciner includes a loop duct (or riser duct) 136. Dried bio-solids can be introduced into duct 136 via a direct pneumatic transport line 138 as shown in FIG. 5.

Contrary to the requirements of the main kiln burner, particle size is not as critical for dried bio-solids introduced into the calciner and the loop duct combustion zone of the cement plant. Larger particle size dried bio-solids can be accommodated in these areas because of the longer retention time in the combustion zone and the fluidizing effect of high gas flows. Furthermore, any particles or fuel that become mixed with the raw meal (feed) will have ample time to oxidize before they are added to the more critical reaction zone of the kiln.

The combustion zone of a cement kiln is one of the hottest industrial processes. Gas temperatures in the main combustion zone can exceed 3500° F. Additionally, these gases remain above 1800° F. for as long as 5 seconds as they move away from the combustion zone. The combination of pre-heated high oxygen content air, high combustion temperatures and long residence time above 1800° F. insures complete combustion of all organic compounds. The calciner loop duct combustion zone consists of the main calciner combustion chamber and the loop duct or riser duct. Gas temperatures in the calciner combustion chamber can read 2500° F. These gases can remain above 1500° F. for as long as five (5) seconds as they leave the calciner combustion chamber and pass through the loop duct to the pre-heater cyclone chambers.

The main components of the raw materials used to manufacture cement are calcium, silica, alumina and iron. The inorganic ash components of dried bio-solids have high concentrations of calcium and silica that can supplement the conventional minerals. Therefore, the inorganic ash residue of dried bio-solids can be beneficially recovered by incorporation into the cementclinker. The intimate mixing of the combustion gases and the cement raw materials as the gases leave the combustion zone ensure complete integration of inorganic ash residues into the conventional raw materials. In this manner the inorganic ash residues become an integral part of the process chemistry. There are minor constituents in the inorganic ash residue of dried bio-solids that must be monitored to insure the quality of the performance of the cement product. Trace components in the ash such as $P_2O_5$, Cl, $Na_2O$, and $K_2O$ must be measured on a regular basis to control any potentially deleterious effect of these components on the cement manufacturing process or the performance of the finished product. Specifically, $P_2O_5$ from dried bio-solids will increase the concentration of potassium in the finished clinker. Research has indicated that when the level of potassium in a clinker approaches 1.5% the setting time of the resulting concrete will be extended. Additionally, high concentrations of $C_1$, $N_2O$ and $K_2O$ from dried bio-solids can cause build up in kiln, which, in turn, can cause operational interruptions.

Having thus described our invention what is desired to be secured by Letters Patent of the United States is set forth in the appended claims.

What is claimed is:

1. A method for drying wet bio-solid material for use as a fuel or fuel additive in a cement making process comprising the steps of:
   extracting excess heat from a clinker cooling apparatus used in said cement making process;
   using said excess heat extracted from said clinker cooler to heat a contact drying surface;
   exposing said wet bio-solid material to said contact drying surface whereby said bio-solids are dried by evaporation of moisture and volatile components from said wet bio-solids;
   condensing water evaporated from said bio-solids for reuse or safe disposed;
   recovering said volatile vapors for introduction into a combustion process in said cement making process; and
   recovering a dried bio-solid product.

2. A method according to claim 1 wherein said contact drying surface is heated by a heat exchange fluid heated by said excess heat in said clinker cooler.

3. A method according to claim 2 wherein temperature of said heat exchange fluid is controlled to control the moisture content of said dried bio-solids.

4. A method according to claim 1 wherein said volatile organic components are introduced into a main burner of a kiln used in said cement making process.

5. A method according to claim 1 wherein said water condensed after evaporation from said bio-solids is used in a gas conditioning step in said cement making process.

6. A method according to claim 1 wherein said dried bio-solid product is inventoried in a storage device.

7. A method according to claim 6 wherein said dried bio-solids are inventoried in a storage device with bio-solids dried off site.

8. A method according to claim 1 wherein said dried bio-solids are cooled to 40° C. or 104° F.

9. A method according to claim 1 wherein said recovered bio-solids are used in a main combustion zone of said cement making process.

10. A method according to claim 1 wherein said recovered bio-solids are used in one of a calciner, loop duct combustion zone or both in said cement making process.

* * * * *